United States Patent [19]

Weiner

[11] Patent Number: 5,305,935
[45] Date of Patent: Apr. 26, 1994

[54] COUPON ORGANIZER

[76] Inventor: Andrea L. Weiner, 1317 Franklin St., Apartment B, Santa Monica, Calif. 90404

[21] Appl. No.: 954,754

[22] Filed: Sep. 29, 1992

[51] Int. Cl.5 .............................................. B60R 7/00
[52] U.S. Cl. ........................................ 224/277; 383/63
[58] Field of Search ................ 224/277, 272, 267, 36, 224/42.46 R; 280/33.992, DIG. 4; 383/63; 150/149

[56] References Cited

U.S. PATENT DOCUMENTS

| | | | |
|---|---|---|---|
| 2,807,265 | 9/1957 | Oliva et al. | 383/66 |
| 4,237,947 | 12/1980 | Mater | 150/149 |
| 4,966,318 | 10/1990 | Dutka | 224/42.46 R |
| 5,002,215 | 3/1991 | Gregoire | 224/277 |
| 5,038,986 | 8/1991 | Beauchesne | 224/277 |
| 5,048,736 | 9/1991 | Anatra | 224/277 |
| 5,077,064 | 12/1991 | Hustad et al. | 383/63 |

OTHER PUBLICATIONS

Exhibit 1-Liluan Vennon Catalog Sep. 1992.
Exhibit 2-Walter Drake Catalog-Aug. 1992.
Exhibit 3-L.A. Times.
Exhibit 4-L.A. Times Aug. 1992.
Exhbit 5-L.A. Times Sep. 1992.
Exhibit 6-Current Catalog-Sep. 1992.
Exhibit 7-Current Catalog-Sep. 1992.
Exhibit 8-Current Catalog Sep. 1992.
Advertisement from *Washington Post* of Mar. 4, 1990.

*Primary Examiner*—Renee S. Luebke
*Attorney, Agent, or Firm*—William H. Maxwell

[57] ABSTRACT

A portable coupon organizer for organizing and transporting coupons to the supermarket, having a plurality of double-sided, viewable and sealable coupon pockets, which can be attached to the handle of a shopping cart. The coupon organizer once attached to the shopping cart, is capable of rotating on the handle. The organizer enables a shopping list or store map to be stored. Each pocket can be labeled to a shopper's desire for easy organization of coupons. The organizer can be used either partially or in its entirety. Portions of the organizer can be replaced when needed, obviating the need to replace the entire organizer.

10 Claims, 3 Drawing Sheets

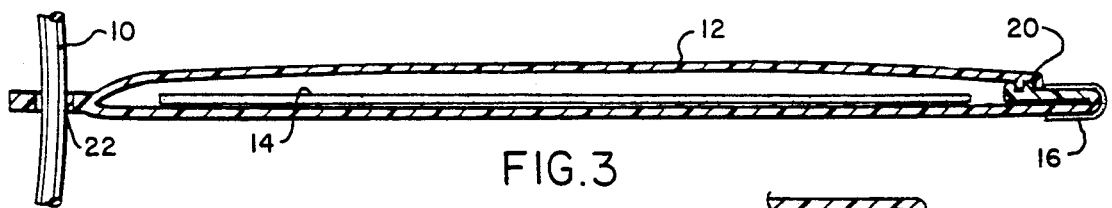
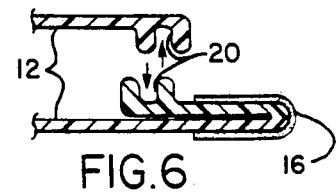
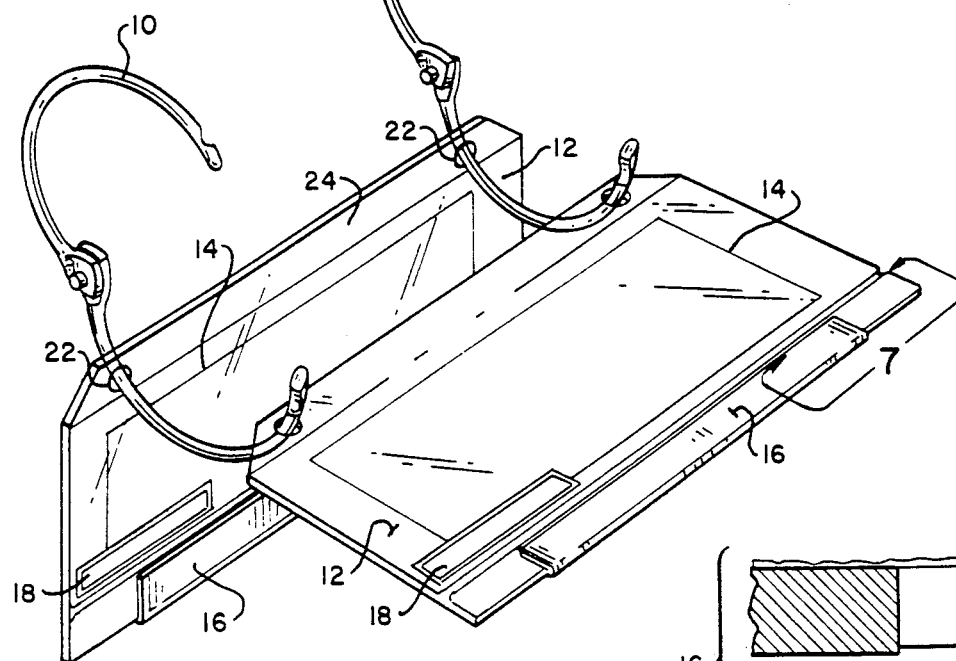
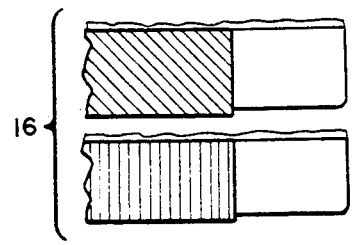
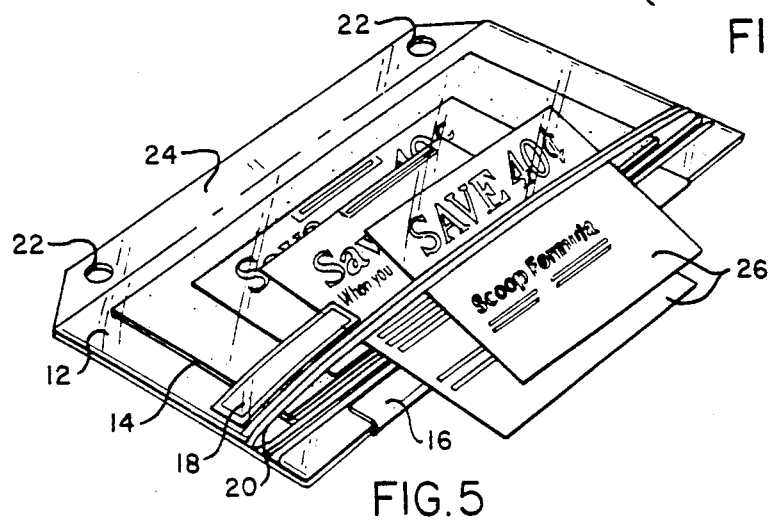

COUPON ORGANIZER

1. Field of Invention

This invention relates to a coupon organizer for organizing and indexing coupons, which is attachable to a shopping cart or child safety seat while shopping.

2. Description of Prior Art

The use of coupons to obtain discounts, rebates, savings and/or other benefits is quite common. Coupons are received from a wide variety of sources for a wide diversity of products, those sources including magazines, newspapers and mailers. The careful shopper usually takes advantage of these coupon offers as much as possible in order to keep shopping expenses low. Due to the wide diversity of coupons, the coupon collector is faced with what can be a formidable challenge: that of cutting out the coupons, saving them and organizing them in a manner for quick and easy use while shopping.

The prior patented art includes numerous coupon organizers, but none like the present invention. U.S. Pat. No. 5,038,986 by Beauchesne (1991) August 13, attaches to a shopping cart and has viewable coupon compartments. However, although the Beauchesne device is more convenient than some prior devices in that it attaches to the shopping cart and has viewable coupon compartments, the coupon compartments are one sided only and it has the disadvantage of hanging down the back side of the shopping cart, thus not allowing for easy view or access to the coupons, as well as it needs to be either unrolled or rolled prior to or after use. U.S. Pat. No. 4,954,003 by Shea (1990) Sept. 4, has viewable coupon compartments in a notebook-like organizer. However, it is not able to attach to a shopping cart handle or child safety seat and the viewable coupon compartments are viewable from one side only, as the other side possesses an "aisle card", thus not allowing the user to view the contents of the coupon compartment from both sides, as well as only having one compartment per pouch for storing coupons. The remaining prior art includes coupon organizers that vary from purse-like, box-like or even folder-like coupon organizers and include U.S. Pat. No. 5,002,215 by Gregoire (1991) Mar. 26, U.S. Pat. No. 4,795,196 by Hyun, Higgins II, Morgan (1989) Jan. 3, U.S. Pat. No. 4,892,192 by Hagne, Hange (1990) Jan. 9, U.S. Pat. No. 4,450,994 by Holland (1984) May 29, U.S. Pat. No. 4,004,690 by Giarritta (1977) Jan. 25.

Unfortunately, all the coupon organizers heretofore known suffer from a number of disadvantages:

(a) They possess only one storage compartment per pocket.

(b) There is no capability of looking and flipping through double sided coupon pockets at the same level as the shopping cart handle, once the organizer is attached to the shopping cart handle.

(c) They do not possess a rib and groove closure to ensure prevention of coupons from being spilled while shopping.

(d) The organizer has to be prepared before transportation.

(e) The entire organizer has to be used. There is no capability of being able to use only a portion of the organizer at a time for smaller trips to the supermarket.

(f) Once the organizer wears out, it must be replaced in its entirety.

(g) Pre-printed labels are given to the user, without enabling the user to choose his/her choice of category for storage of coupons.

(h) They are in bound books, thus not allowing the user the ability to attach the organizer to the handle of the shopping cart.

OBJECTS AND ADVANTAGES

Accordingly, several objects and advantages of my invention are:

(a) to provide a novel coupon organizer which enables a shopper to utilize coupons more efficiently while shopping;

(b) to provide a coupon organizer which helps a shopper organize coupons;

(c) to provide a lightweight, portable coupon organizer which is designed to be releasably attached to a handle of a shopping cart to enable a shopper to utilize coupons more efficiently while shopping;

(d) to provide a coupon organizer that will prevent coupons from being spilled during shopping;

(e) to provide a coupon organizer in which the compartments can be labeled according to the shoppers desire;

(f) to provide a coupon organizer that may be easily carried;

(g) to provide a coupon organizer that is ready at any time for transportation with no preparatory measures needed to be taken;

(h) to provide a coupon organizer that has a plurality of two-sided pockets that are easily viewable and accessible;

(i) to provide a coupon organizer that can be used partially or in its entirety;

(j) to provide a coupon organizer that has a long life cycle;

(k) to provide a coupon organizer that can be added on to, for more storage of coupons;

(l) to provide a coupon organizer that can be replaced in individual parts as replacements need to be made without having to replace the entire organizer;

(k) to provide color coding of the coupon organizer enabling the user to determine his/her own method of food or product groups;

Further objects and advantages are to provide a coupon organizer which can be used easily and conveniently to store and use coupons, which can be attached to and flipped through at the shopping cart handle level (obviating the need to bend over to view or access coupons), which can be used partially and not have to be used in its entirety, which does not have to be bound together in any manner that books, brochures or other textual materials are bound, which offers a multiplicity of double-sided pockets and does not limit compartments for storage of coupons, which possesses a strong rib and groove pocket seal, that prevent spilling of coupons, which can be replaced by individual part needs without having to replace the entire organizer. Still further objects and advantages of my invention will become apparent from a consideration of the drawings and ensuing description.

DRAWING FIGURES

An embodiment of the inventive coupon organizer is shown in FIGS. 1,2,3,4,5,6,7, and 8.

FIG. 1 shows a perspective view of a basic version of my coupon organizer 32.

FIG. 2 is a front view of an individual coupon pocket 12. Each side of coupon pocket 12 possesses a visible coupon compartment. A pocket extension or header portion 24 of the coupon pocket having holes and which, with rings 10, serves as a connection means for securing coupon pockets 12 to a handle 28 of the shopping cart. Rings 10 facilitate the, flipping of coupon pockets 12 in coupon organizer 32.

FIG. 3 is a cross section of coupon pocket 12.

FIG. 4 is a view of rings 10 in an open position ready to be secured to a shopping cart handle 28. The view of released rings 10 in this diagram also shows coupon pockets 12 can be added to or taken off of rings 10 according to the shopper's desires.

FIG. 5 is a view of coupon pocket 12 whereby coupons 26 can be inserted through a rib and groove closure 20 located at the top of each coupon pocket 12. A divider 14 is located in each coupon pocket 12, separating the compartment into front and back sections. allowing two categories of coupons 26 to be inserted into the coupon pocket 12 on either side of divider 14. Coupon pocket 12 is transparent, enabling coupons 26 to be easily viewed. Identification label 18 enables the user to write in the appropriate category according to his or her desire.

"FIG. 6 is a cross-section of rib and groove closure 20."

FIG. 7 is a view of color coded label 16 for the shopper to categorize coupons 26 to whichever food or product group he/she prefers, e.g., meat products, milk products, household products, personal products, etc..

Figure 8:
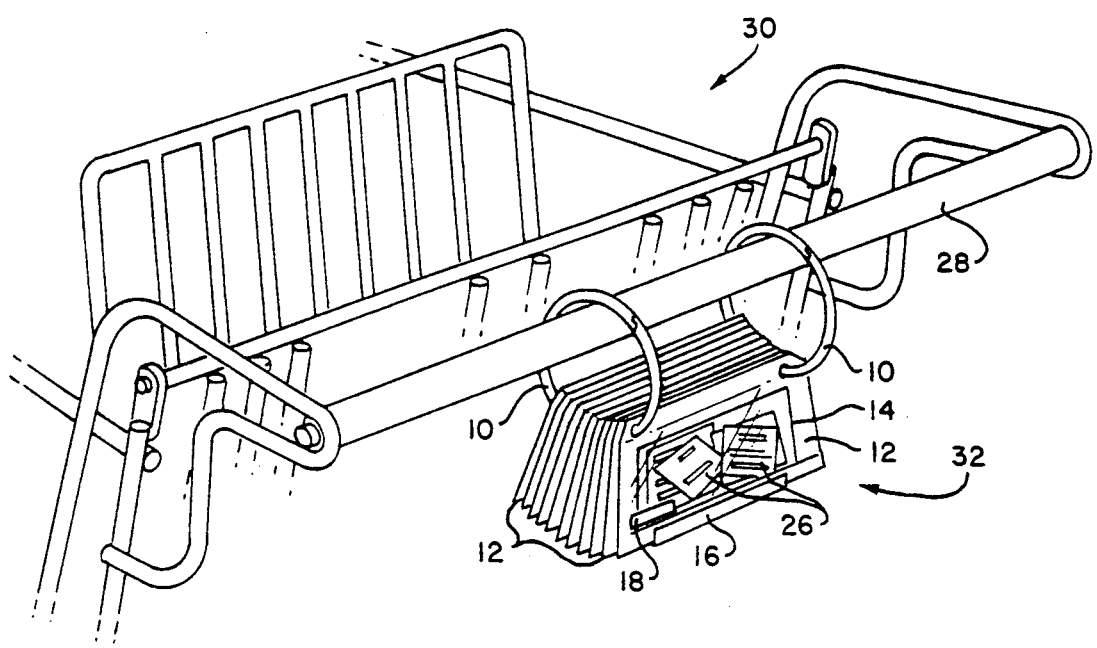

FIG. 8 is a perspective view of coupon organizer 32 attached to handle 28 of shopping cart 30.

PREFERRED EMBODIMENT

Figure 1:
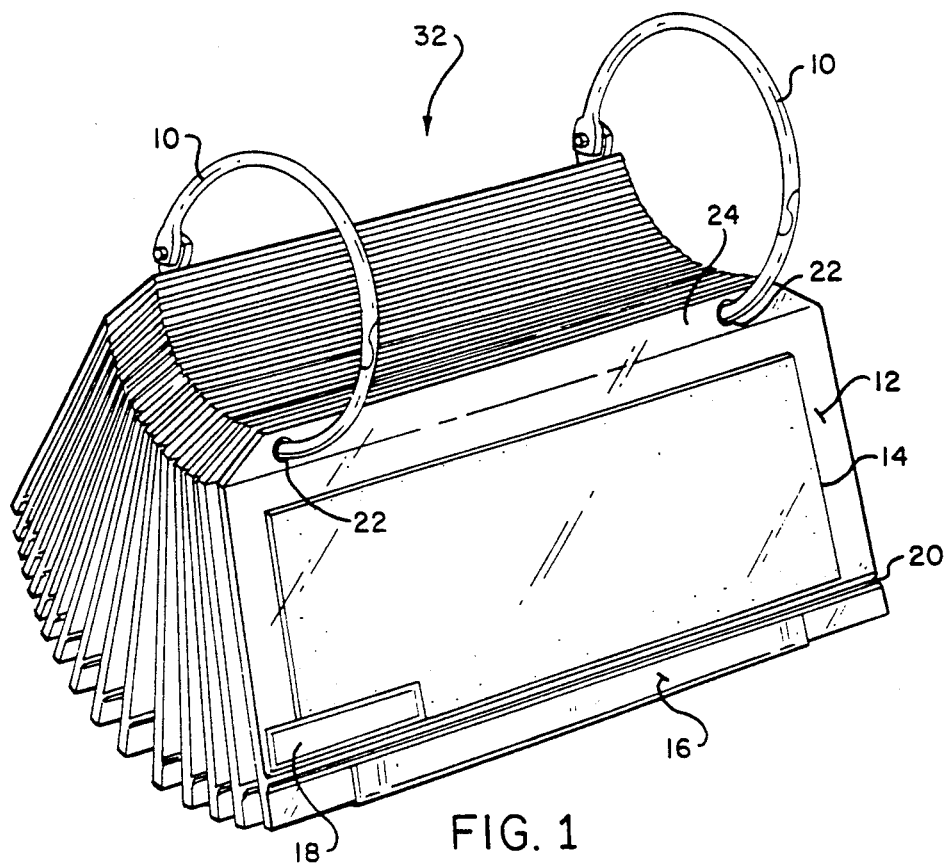

With reference to the drawings, coupon organizer 32 depicted in FIG. 1 is shown in FIG. 8 attached to handle 28 of shopping cart 30. As shown, coupon organizer 32 rotates on shopping cart handle 28 in a manner that can be easily reached and used by the shopper. Coupon organizer 32 is comprised of a plurality of coupon pockets 12 of flat configuration which are sufficiently large to comfortably hold coupons 26 and yet not be so wide that it does not fit easily onto shopping cart handle 28.

A seal 20 is located at the top edge of each coupon pocket 12, preferably formed as a rib and groove ZIPLOC ® seal. Coupon pocket 12-, may contain a label 18 depicting a category according to the shopper's needs and desires, which may be by the type of product such as cat foot, cereals, frozen foods, pasta, ice cream, etc., which may be arrayed in alphabetical order for easy retrieval of coupons 26.

Coupon pocket 12 may be constructed of a flexible material such as a thermoplastic composition such as plasticized polyvinyl chloride, polyvinyl chloride copolymers, such as the copolymers thereof with vinyl acetate and the art known equivalents thereof. Conventional transparent plastic is preferred for construction of pockets 12. The dimension of coupon pocket 12 is $3\frac{1}{2}'' \times 6\frac{1}{2}''$.

Ring 10 preferably is made of steel and is substantially larger in diameter than the handle of the shopping cart, for example 3" in diameter. Divider 14 is preferably made of cardboard (preferably recycled cardboard) and is $2\frac{1}{2}'' \times 5''$.

Coupon organizer 32 can also include a shopping list. The shopping list is used to record shopping items that are desired or needed by the user. The shopping list facilitates planning and preparation for shopping before leaving home.

Coupon organizer 32 can also include coupon pocket 12 for holding miscellaneous coupons (e.g. fast foot restaurant coupons, theatre coupons, automotive coupons, etc.) or may also hold postage stamps or a calculator. Coupon pocket 12 is transparent on both the front and back sides thus allowing the contents (e.g. coupons, postage stamps or calculator) to be viewed at either side of the divider 14 (see FIG. 3).

Figure 2:
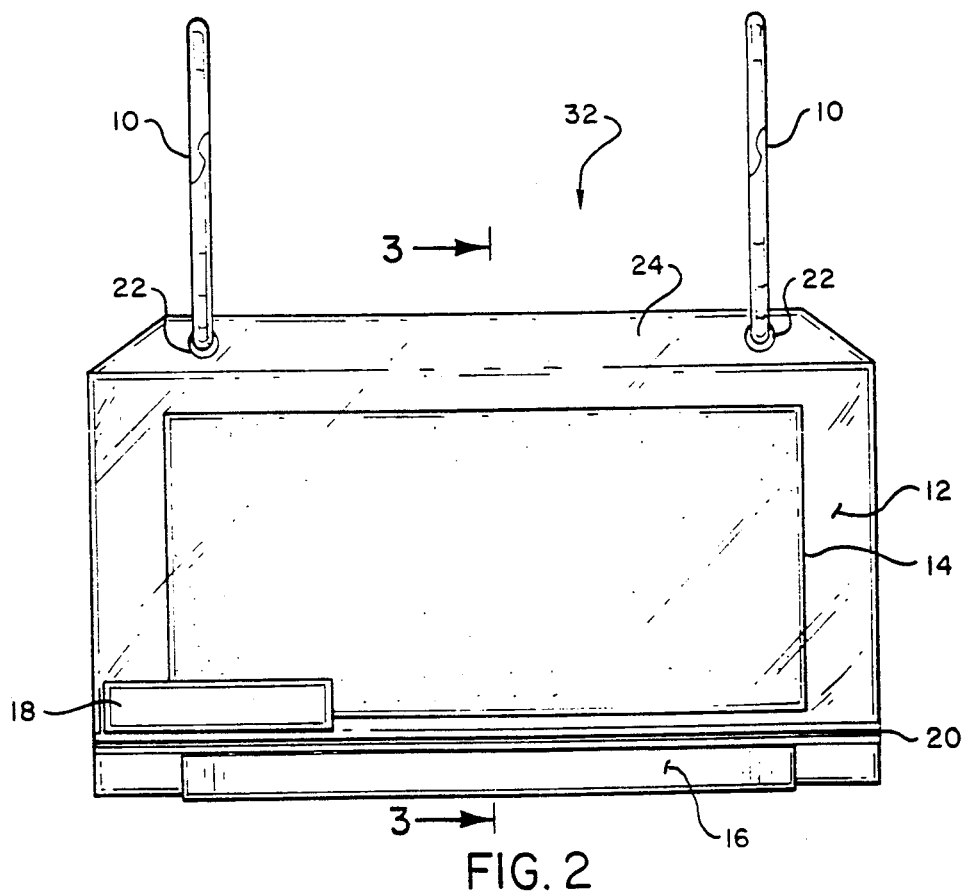

Coupon organizer 32 can be easily connected and disconnected from handle 28 of shopping cart 30. Rotational connecting means, in the form of rings 10 are provided for releasably connecting coupon organizer 32 to shopping cart handle 28. As shown in FIG. 4, the rings 10 open for release, and as shown in FIGS. 1, 2 and 8 they snap closed for securement.;

Operation—FIGS. 1, 4, 5, 8

To use coupon organizer 32, a shopper clips coupons 26 from advertising copy and place coupons 26 in the appropriate marked compartment. Upon reaching the store and selecting shopping cart 30, the shopper connects organizer 32 to handle 28 of shopping cart 30 simply by opening and closing rings 10.

The present invention facilitates the organizing, storing and retrieval of coupons 26 in many ways. Prior to shopping, coupons 26 can be quickly and easily separated into the repeated coupon compartment sections within coupon pockets 12. Coupons in each coupon packet 12 can be organized so that the most preferred or desired coupon 26 is in the front of coupon pocket 12 so as to be easily seen therethrough. Coupons 26 can be arranged by expiration date so those coupons 26 with the earliest expiration dates would be in front so such are used first. Once at the supermarket, whenever a coupon 26 is desired it is easily retrieved merely by opening the coupon pocket 12 and pulling the coupon through the top slit. The coupon organizer 32 can be easily carried by hand to and from shopping.

Thus, it is apparent that a new and non-obvious device for organizing, storing and retrieving coupons has been provided by the present invention which makes any coupon user's shopping trips easier and more fruitful than what is currently the case.

SUMMARY, RAMIFICATIONS, AND SCOPE

Accordingly, the reader will see that this organizer can be used to store and access coupons easily and conveniently, can be taken partially or entirely to the supermarket and and can be sealed, thereby preventing coupons from spilling. In addition, this coupon organizer provides a highly reliable device that can be easily used by persons of almost any age. Furthermore, this coupon organizer has the additional advantages in that it permits the shopper to attach the organizer to the handle of a shopping cart or child safety seat;

it permits shoppers to label the primary holding means according to their desire;

it permits the shopper to get up and go with it, without any preparatory transportation measures needed to be taken;

it permits storage of a great number of coupons as it possesses double-sided pockets, thus allowing two compartments per pocket;

it permits the user to replace individual parts of the organizer, without having to replace the organizer in its entirety;

it permits the shopper to add more pockets when desired;

it permits shoppers to color categorize food or product groups according to their desire.

While my above description contains many specificities, these should not be construed as limitations on the scope of the invention, but rather as an exemplification of one preferred embodiment thereof. Many other variations are possible. For example, the pockets can have other shapes, such as circular, oval, trapezoidal, triangular, etc.; the pocket divider can have shapes, the rings can be replaced by other connecting means, etc.. Besides storing coupons, this invention could also store hardware, craft supplies, game pieces, baby goods, doll clothes and accessories, sewing supplies, office supplies and recipes.

Thus the scope of the invention should be determined by the appended claims and their legal equivalents, rather than by the examples given.

While a preferred embodiment of the present invention has been described in detail, various modifications, alternations and changes may be made without departing from the spirit and scope of the present invention as defined in the appended claims.

I claim:

1. A coupon organizer to attached a horizontally disposed handle spaced from a basket of a shopping cart, and including;
    a plurality of coupon pockets, each having a chamber with at least one transparent side and an opening at an edge for insertion of and access to coupons in said chamber, and a header portion having at least one connection opening therethrough,
    and at least one connection ring engaged through said at least one connection opening and around the horizontal handle of the shopping cart and from which the coupon pockets depend,
    whereby particular coupons are viewed through the transparent side of a selected pocket by lifting and selectively flipping the coupon pockets around the handle of the shopping cart.

2. The coupon organizer for shopping carts as set forth in claim 1, wherein the at least one connection ring is substantially greater in diameter than the diameter of the handle of the shopping cart for free rotation when lifting and flipping the coupon pockets.

3. The coupon organizer for shopping carts as set forth in claim 1, wherein the at least one connection ring opens for release and snaps closed for securement.

4. The coupon organizer for shopping carts as set forth in claim 1, wherein each of the coupon pockets has opposite transparent front and back sides for viewing coupons inserted into said chamber.

5. The coupon organizer for shopping carts as set forth in claim 1, wherein each of the coupon pockets has opposite transparent front and back sides, there being a divider positioned in each coupon pocket and separating its chamber into front and back sections for viewing particular coupons through said opposite transparent front and back sides of said coupon pockets.

6. The coupon organizer for shopping carts as set forth in claim 1, wherein the coupon pocket opening at said edge is closed by a seal to capture coupons within the chamber.

7. The coupon organizer for shopping carts as set forth in claim 1, wherein the coupon pocket opening at said edge is closed by a rib and groove seal to capture coupons within the chamber.

8. The coupon organizer for shopping carts as set forth in claim 1, wherein there are spaced connection openings through the header portion of the coupon pockets, and spaced connection rings engageable therethrough.

9. The coupon organizer for shopping carts as set forth in claim 8, wherein the spaced connection rings are of substantially greater diameter than the diameter of the handle of the shopping cart for free rotation when lifting and flipping the coupon pockets.

10. The coupon organizer for shopping carts as set forth in claim 8, wherein the spaced connection rings open for release and snap closed for securement.

* * * * *